Oct. 3, 1961  J. BAIRD  3,002,343
THRUST-REVERSING MECHANISM FOR JET AIRCRAFT
Filed Oct. 29, 1956  6 Sheets-Sheet 1

INVENTOR.
JOHN BAIRD
BY
D. Gordon Angus
ATTORNEY.

Oct. 3, 1961 J. BAIRD 3,002,343
THRUST-REVERSING MECHANISM FOR JET AIRCRAFT
Filed Oct. 29, 1956 6 Sheets-Sheet 2

INVENTOR.
JOHN BAIRD
BY
D. Gordon Argus
ATTORNEY.

INVENTOR.
JOHN BAIRD
BY
ATTORNEY

Oct. 3, 1961 J. BAIRD 3,002,343
THRUST-REVERSING MECHANISM FOR JET AIRCRAFT
Filed Oct. 29, 1956 6 Sheets-Sheet 4

INVENTOR.
JOHN BAIRD
BY
*D. Gordon Angus*
ATTORNEY.

Oct. 3, 1961     J. BAIRD     3,002,343
THRUST-REVERSING MECHANISM FOR JET AIRCRAFT
Filed Oct. 29, 1956     6 Sheets-Sheet 5
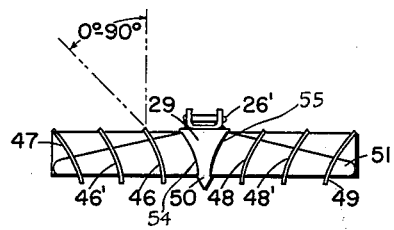
Fig. 7
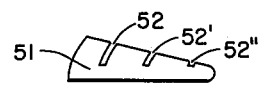
Fig. 9
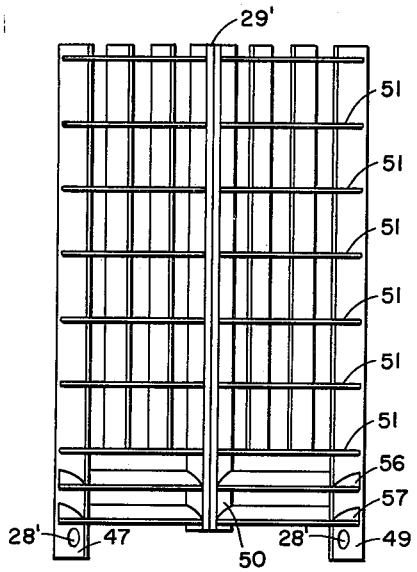
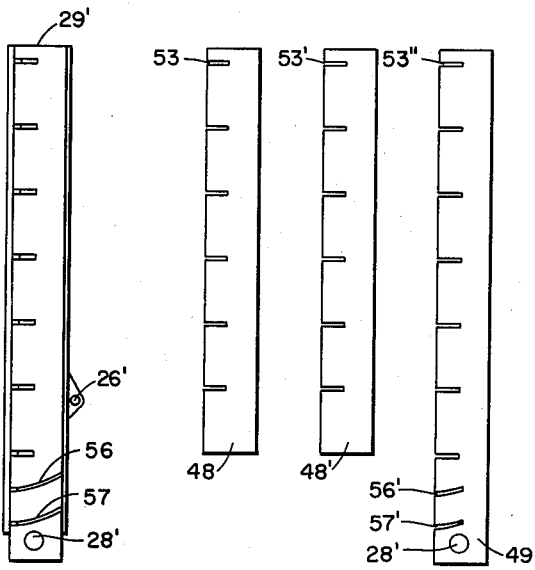
Fig. 6     Fig. 8     Fig. 10
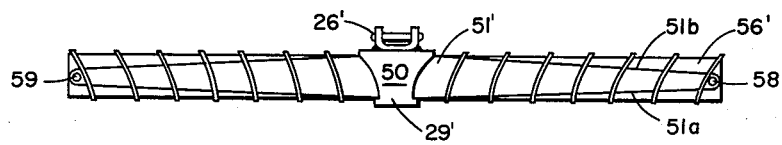
Fig. 11
INVENTOR.
JOHN BAIRD
BY
D. Gordon Angus
ATTORNEY.

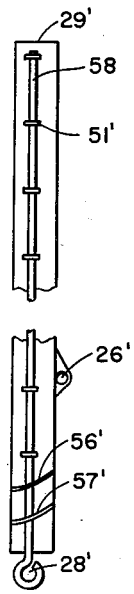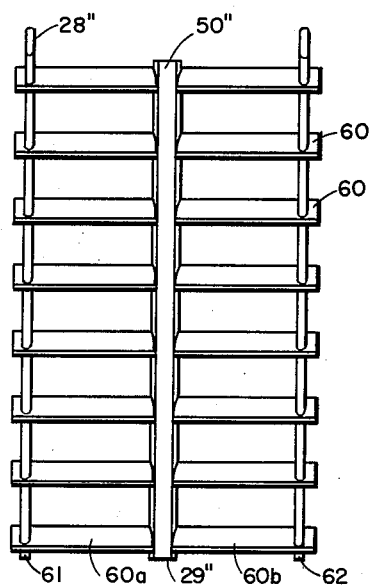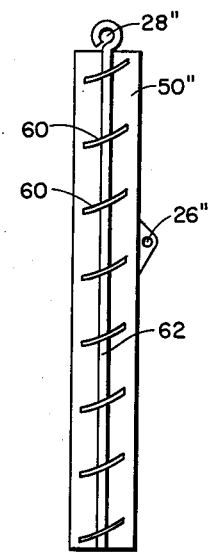
*Fig.12*  *Fig.13*  *Fig.14*
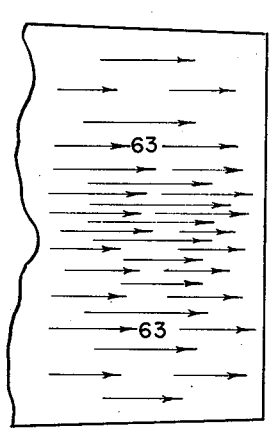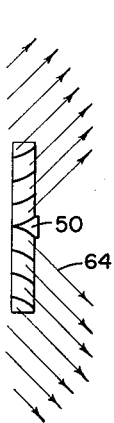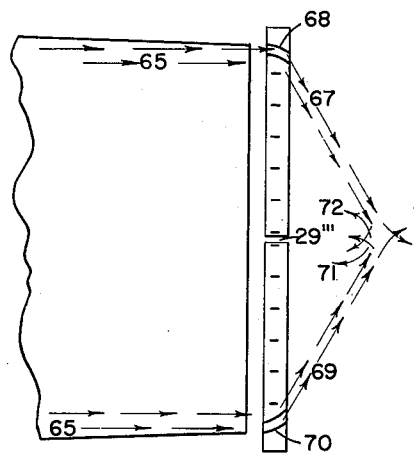
*Fig.15*  *Fig.16*
INVENTOR.
JOHN BAIRD
BY
ATTORNEY.

United States Patent Office 3,002,343
Patented Oct. 3, 1961

3,002,343
THRUST-REVERSING MECHANISM FOR JET AIRCRAFT
John Baird, Downey, Calif., assignor to Aerojet-General Corporation, Azusa, Calif., a corporation of Ohio
Filed Oct. 29, 1956, Ser. No. 619,022
8 Claims. (Cl. 60—35.54)

This invention relates to thrust reversers for jet engines, and has for an object to provide a thrust reverser mechanism which does not impede the jet stream when reverse thrust is not desired, and which thereby permits the full forward thrust of the jet engine to be realized, when desired.

A further object of the invention is to provide a thrust reverser which "fails safe" in the event of failure.

A means for reversing the direction of thrust of an aircraft jet engine is capable of providing many significant improvements in the overall performance of an aircraft. For example, the heavy wheel brakes and parachute brakes currently in use for stopping aircraft in high speed landings could be largely, or even entirely, eliminated by braking the aircraft with a reverse jet thrust. In flight, reverse thrust could eliminate the need for speed spoilers such as dive brakes.

Reversibility of thrust direction also permits the rotating parts of the engine to be run at high r.p.m. without exerting forward thrust. This is of importance in landing approaches. In current practice a jet engine is throttled back to low r.p.m. in order to reduce engine thrust and air speed during landings. If the landing is unsuccessful, and the pilot must pull up, there is a time duration required for speeding up the engine during which there may be insufficient power to keep the airplane safely off the ground. Many accidents have occurred because the aircraft has flown into an obstacle without power to fly over it due to the lack of power during this time. With this invention, the aircraft can be braked even while the engine operates at maximum r.p.m.

In thrust reversers as heretofore built, one known expedient has been to deflect the jet stream from the engine onto a series of turning vanes, which reverse the direction of flow of the fluid. Such devices have utilized obstructions in the fluid stream for deflecting the stream onto the turning vanes. These obstructions have been permanently placed in the jet stream, usually being hinged in some manner so that there are positions of maximum and minimum obstruction. But there has always been some obstruction of the jet stream. In practice, it has been found that approximately 4% of the useful forward thrust has been dissipated by such devices, even when the obstructions are disposed at their position which causes a minimum impedance of the jet stream.

The present invention is carried out in combination with a jet engine which produces a jet stream of fluid, usually comprising hot, expanding gases. A turning vane means is disposed to the side of the jet stream. A feature of the invention resides in a deflector flap means which is pivotally mounted at the side of the jet so that it can be moved into, and also completely out of, the jet stream. When the deflector flap is moved into the jet stream it causes the fluid of the jet stream to expand sufficiently so that the edge of the jet stream is intercepted by the turning vanes. When completely out of the jet stream, the deflector flap does not have any effect thereon, and the full forward thrust of the jet engine may be realized.

In accordance with one embodiment of the invention a deflector flap is provided with a series of primary deflecting vanes with surfaces that deflect a considerable portion of the jet stream. The stream is deflected in such a manner that the fluid of the jet stream is caused to expand sufficiently so that the edge of the jet stream is intercepted by the turning vanes.

A preferred feature of this arrangement resides in secondary deflecting vanes that deflect a portion of the jet stream inward toward the central axis of the jet stream. The inward deflection is in such a manner that part of the fluid of the jet stream flows behind a deflector flap on the downstream side and maintains pressure behind the flap, which pressure would otherwise decrease due to the flap obstructing the stream flow. Such prevention of decrease of pressure on the downstream side of a flap helps maintain the deflected exhaust stream flow in the direction in which it has been deflected.

According to a preferred but optional feature of the invention the obstructing flap means is moved out of the jet stream by the force of the jet itself except when mechanically held in the obstructing position.

A preferred feature resides in an arrangement for shifting the turning vane means forwardly and rearwardly relative to the exhaust nozzle of the jet engine. Preferably the turning vane means is arranged in a cascade of turning vanes.

The foregoing and other features of the invention will be more fully understood from the following detailed description and the accompanying drawings, of which:

FIG. 6 is a front view of a form of deflecting device which can be used instead of the form shown in the embodiment of FIGS. 1 to 5;

FIG. 7 is a top view of the device shown in FIG. 6;

FIG. 8 is a side view of the device shown in FIG. 6;

FIG 9 is a view of a strut used in the device in FIGS. 6 to 8;

FIG. 10 is a view of primary vanes adapted to the strut in FIG. 9;

FIG. 11 shows another variation of construction of a deflecting device;

FIG. 12 shows a side view of the construction shown in FIG. 11;

FIG. 13 shows another variation of construction of a deflecting device;

FIG. 14 shows a side view of the construction shown in FIG. 13;

FIG. 15 shows a schematic top view of primary gas flow direction before and after having gas flow direction changed by primary vanes of the deflecting device in FIGS. 6 to 8; and FIG. 16 shows a schematic side view of secondary gas flow direction before and after having gas flow direction changed by secondary vanes of the deflecting device in FIGS. 6 to 8;

Figure 1:
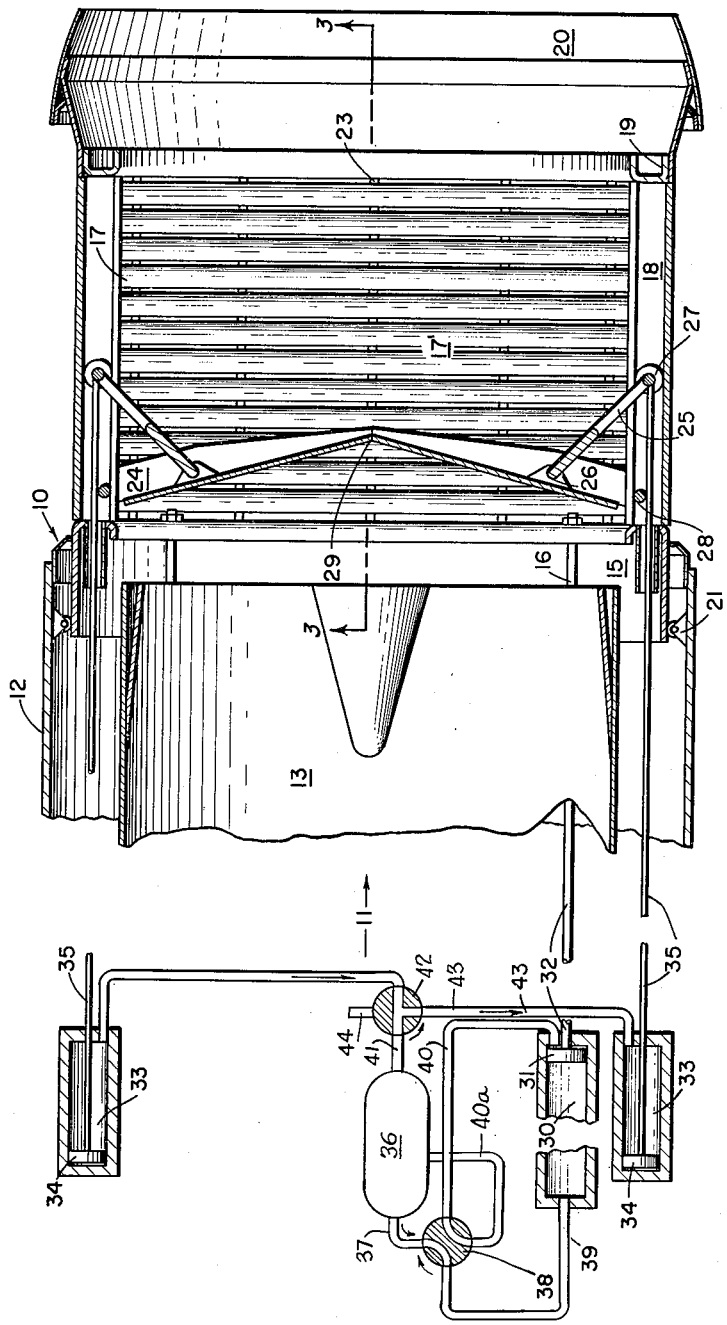
FIG. 1 is a fragmentary side elevation, in cross-section, taken at line 1—1 of FIG. 2, of a jet engine incorporating a thrust reverser according to this invention, and showing the thrust reverser in an actuated position.
Figure 2:
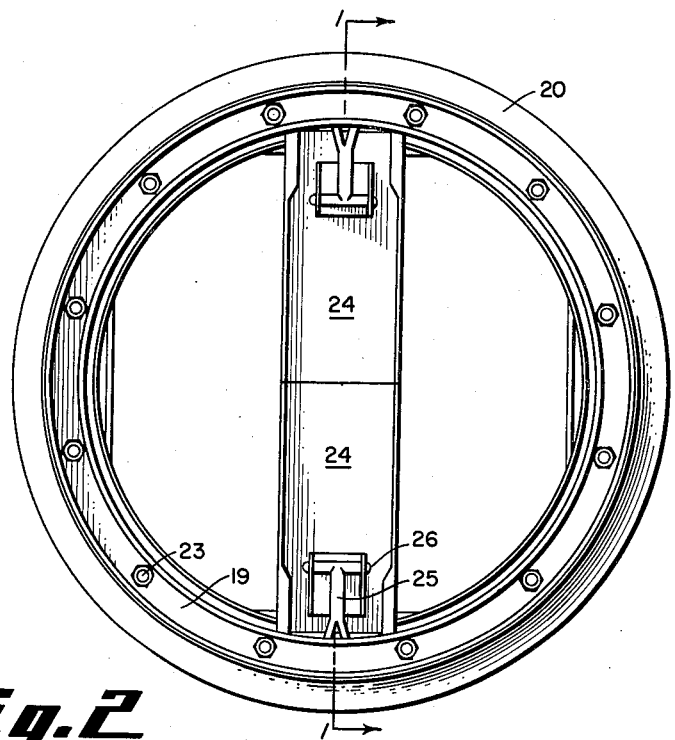
FIG. 2 is an end view showing the thrust reverser of FIG. 1 in actuated position.

In FIGS. 1 through 4 there is shown the rear portion of a jet engine nozzle or tailpipe 10. The direction of fluid flow through this engine is downstream from the left to the right of FIG. 1 as shown by arrow 11, and full forward thrust will be exerted by the engine when the jet stream from the nozzle is unimpeded in that direction.

A conventional shroud 12 encloses the side of the jet engine including its tailpipe.

The thrust reverser means of this invention are intended to be retractable out of the slip stream of the aircraft as well as out of the path of the jet stream when reversal of thrust is not desired. For this purpose, a unison ring 15 surrounds the tailpipe or nozzle of the engine, and is axially shiftable relative thereto. Suspension rods 16 are attached to the unison ring.

A plurality of annular turning vanes 17 are arranged in a cascade 17' by being attached to tracks 18 to which are fixed the turning vanes 17.

Figure 3:
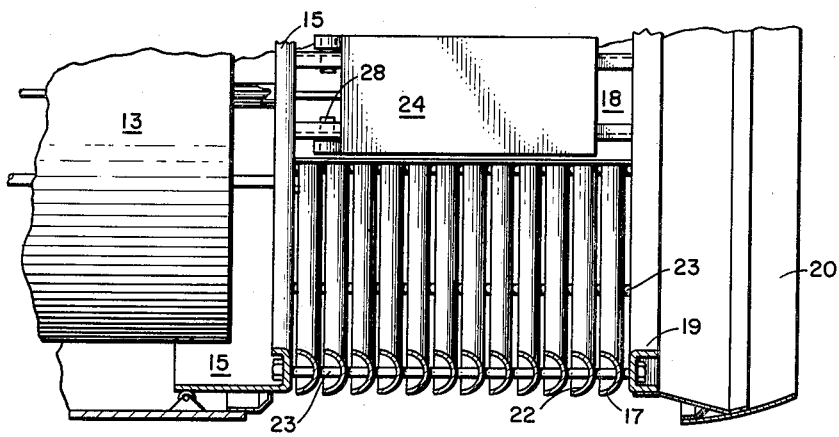
FIG. 3 is a fragmentary cross-section taken at line 3—3 of FIG. 1 in an extended but non-actuated position.

As shown in FIG. 3 each turning vane 17 has a fluid-turning surface 22 which faces upstream. This surface may conveniently be in the same general configuration as the surface of the well-known impulse-type turbine blade. Any number of suspension rods 23 can support the vanes to give rigidity. The diameter of all of the annular turning vane rings is larger than the diameter of the jet stream in normal, non-reversed operations, so that the cascade can be extended rearwardly of the nozzle without impeding the jet stream.

Figure 4:
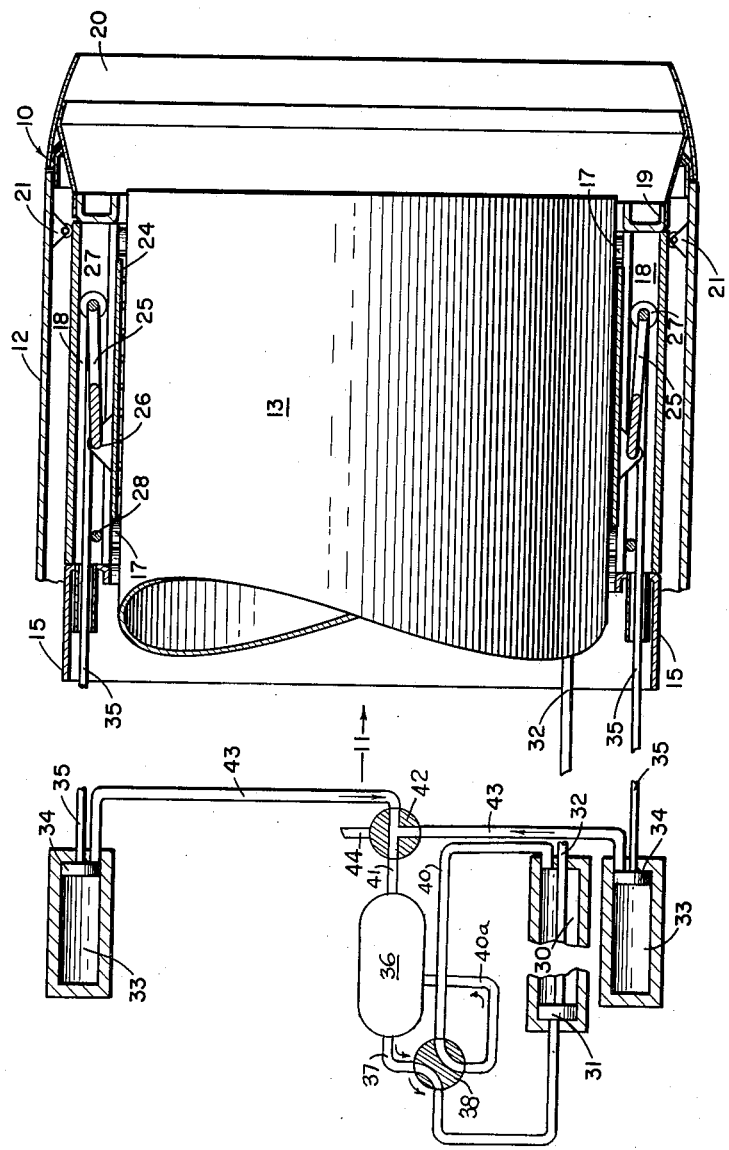
FIG. 4 is a fragmentary side view partly in cross-section, of the device of FIG. 1 in a retracted position.

The unison ring 15 acts as a carriage; and shifting the unison ring rearwardly moves the cascade 17' downstream of the rear of the nozzle as shown in FIG. 1. The cascade 17' has an annular structural member 19 to the rear of the cascade 17' between the movable aft end portion of the shroud 20, cascade 17' and the tracks 18. Shifting the unison ring in the forward direction moves the cascade in the upstream direction relative to the nozzle opening, where it is located around the nozzle opening and is shielded from the slipstream of the aircraft by the nacelle and cowling, as shown in FIG. 4.

Jet stream deflector means are provided for the purpose of deflecting the jet stream from the exhaust throat of the nozzle 13 toward the turning vane cascade when thrust reversal is desired. This comprises flat surface deflector flaps 24 which are hinged at 26 to structure 25 which shifts with the cascade 17', along the suspension tracks 18. As shown in the drawings, a pair of these flaps 24 are provided, although more or less may be used. They are preferably disposed diametrically across the jet stream from each other. By being pivoted at 28 on the side of the jet stream, the flaps can move into the stream, or completely out of it, as desired.

A flap strut slider 25 is pinned to each flap at a point spaced from the hinge 26 by which the flap is attached to its support. The slider is disposed downstream from the flap. The other end of each slider has rollers 27 which roll in the track 18. The track is conveniently mounted so as to move axially with the unison ring and cascade. Moving the rollers upstream and downstream in the track causes the slider to move the flap into and out of the jet stream, respectively. The flap movement is limited by the slider and by flap end contact with the opposing flap at 29 so that the hinged movement of the flap when pressure is released is rearward to a rest position at the side of the jet stream. The tendency of the jet stream is therefore to move the flap out of the stream.

Means is provided for moving the unison ring 15 and cascade 17' rearwardly of the nozzle on track 18 and supporting rollers 21. This comprises a hydraulic cylinder 30 which may be attached to the engine mounting or structure; and a piston 31 moved by fluid pressure in the cylinder attached through any number of flexible push-pull linkages 32 of which only one is shown, to the suspension rods and unison ring. In order to extend and retract the flow-obstructing flaps, hydraulic cylinders 33 are provided. A piston 34 movable by fluid pressure within cylinder 33 is connected by a push-pull linkage 35 to the sliders 25 between the rollers 27. Retraction of the linkage 35 moves the rollers upstream, pivoting the flow-obstructing flaps 24 into the jet stream. There can be as many cylinders 33 and rods 35 as there are flaps.

The cylinders 30 and 33 can be actuated by any suitable source of pressure, which in FIGS. 1 and 4 is represented by the container 36 which may, for example, be a pressurized gas or liquid, as from an air compresser of the engine or the like. The pressure from the source 36 is supplied to cylinder 30 over a conduit 37 which leads to a valve 38 being a two way valve of a conventional type, which in one position applies the pressure over conduit 39 to the left side of cylinder 30, while bleeding off any pressure in another conduit 40, through the valve 38 and conduit 40a into the source. In the other valve position, as shown in FIG. 4, supplies pressure over conduit 40 to the righthand side of the cylinder 30 while bleeding off any pressure in conduit 39, through the valve 38 and conduit 40a into the source 36.

Pressure from source 36 is also supplied to cylinder 33 over a conduit 41 which leads from the pressure source to a valve 42 (which may be similar to valve 38). Conduits 43 lead from valve 42 to the right side of cylinders 33, and means 44 is provided to release pressure from cylinder 33, as shown schematically in FIGS. 1 and 4. The valve systems shown are schematic only.

Figure 5:
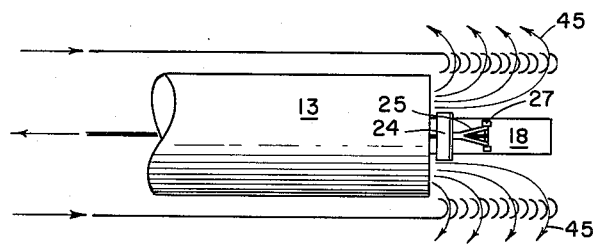
FIG. 5 is a schematic diagram of the flow pattern produced by the thrust reverser of FIG. 1.

In normal operation of the engine, the exhaust stream leaves the exhaust nozzle in the usual manner to produce the thrust of the engine. The cascaded vanes will be located in their retracted position as shown in FIG. 4 where they are located well outside the periphery of the jet stream. When it is desired to produce a reverse thrust, as when the airplane containing the engine is to be slowed down, as when landing, the cascade will be moved rearwardly as shown in FIGS. 1 and 3 which is done by turning valve 38 to apply pressure to the left side of the cylinder 30 which will move the entire assembly of unison ring 15 and the cascaded vanes 17 to the rearward position shown in FIGS. 1 and 3. After or at the same time as the cascade is thus extended to this extended position, the valve 42 can be operated to pressurize the cylinder 33 which will then move the push-pull rods 35 upstream to operate arm 25 to the position shown in FIG. 1 which moves the obstructions 24 into their position across the jet stream issuing from the exhaust nozzle. This is the position shown in FIGS. 1 and 5.

The presence of the obstructions 24 across the jet stream has the effect of changing the shape of the jet stream after it leaves the nozzle. With the diametrically opposite flaps shown, the jet stream divides and enlarges so that its edge no longer lies wholly within the circumference of the cascaded annular turning vanes, as was the case before the obstructing flaps 24 were placed in the obstructing position. As thus expanded, the circumferential edge of the jet stream enters the several annular turning vanes as shown by the jet pattern 45 of FIG. 5; and are thus turned around by the U-shape of the vanes so that the gases leaving the vanes flow in the forward direction to produce a reverse thrust on the vanes.

When it is desired to remove the thrust reversing effect instantly, the valve 42 is turned to bleed off pressure through release means 44 which will move rod 35 to the right due to the force of the jet stream and cause flaps 24 to retract to the position of FIG. 3.

In order to withdraw the cascade within the shroud 12, the valve 38 is turned to pressurize the right side of cylinder 30 through conduit 40 as shown in FIG. 4.

FIGS. 6 to 8 show another form of flap which can be used in place of the flaps 24 of FIGS. 1 to 5. In this modification the flap comprises a number of spaced curved vanes 46, 46', 47, 48, 48' and 49. The structure of the flap is mounted on a center post 50 on either side of which there are fastened, as by welding, a number of spaced parallel struts 51 perpendicular to the center post. For the purpose of receiving the vanes 46, 46', 47, 48, 48' and 49, the struts are formed with slots 52, as shown in FIG. 9 which illustrates one of the struts. To permit assembly of the curved vanes, each vane is slotted 53 at a position corresponding with the respective struts as shown in FIG. 10 which shows three of the vanes 48, 48' and 49 from one side of the center post. Slots 56' and 57' on vane 49 are positioned to receive secondary vanes 56 and 57 respectively.

As is shown in FIG. 7, the center post is provided with curving sides 54 and 55 so that the post is thicker at the rear than at the front. Similarly, the several vanes 46, 46', 47, 48, 48' and 49 curve in correspondence with the curvature of the side wall of the center post.

It will be recognized that the gases of the jet passing rearwardly will pass through the spaces between the vanes and will be deflected to the left and the right respectively by the respective vanes at the left and right side of the center post. These vanes 46, 46', 47, 48, 48' and 49 are herein called "primary vanes."

In addition to the primary vanes there are provided curved secondary vanes 56 and 57 at the end of the flap which is to be pivoted at 28'. For this purpose, the center post 50 extends beyond the parallel struts 51 and the end primary vanes 47 and 49 extends to a similar extent beyond the other primary vanes. The vanes 56 and 57 herein called "secondary vanes," are then welded in position as shown in FIGS. 6 and 8 to deflect gases toward the end of the flap at 29 which is to be unattached to the jet engine structure.

The flap can be attached to the structure of FIGS. 1 to 5 in the same way as the flap 24. For a pivot point on the flap there is placed at 28' a hole to receive a pivot pin on the ends of vanes 47 and 49. The flap is also attached by the flap strut slider 25 pinned to each flap center post 50 by means of a bracket hinge at 26' having a hole to receive a pin interconnecting a slider 25 and hinge 26'.

The curved surfaces of the primary and secondary vanes are designed to deflect gases in the manner discussed above. As shown in FIG. 7 and FIG. 8, the angle of deflection surfaces may vary however, from some value greater than 0° up to 90°. The flat flap 24 shown in FIGS. 1 to 5 is a 90° deflection surface.

FIGS. 11 and 12 show another variation of the flap of FIGS. 6 to 8. In FIG. 11 and FIG. 12 there are a plurality of spaced parallel struts 51' on either side of the supporting center post 50', the center post acting as a primary supporting member. Each strut 51' has its two edges tapered at 51a and 51b. There are provided a pair of secondary posts 58 and 59 passing through the ends of the parallel struts 51' and on either side of the center post 50'. The secondary posts 58 and 59, acting as secondary supporting members, also pass through the secondary vanes on their ends and the secondary posts are spot welded to the struts 51' and the secondary vanes 56'.

FIGS. 13 and 14 show another flap construction which can be used in place of flaps 24 in FIGS. 1 to 5. The flaps of FIGS. 13 and 14 have only primary vanes 60 which deflect gases of the jet passing rearwardly through the spaces toward the attached end 28" of the flap which is the end to be attached to structure 35. The primary vanes 60 are each in two segments 60a and 60b welded respectively on opposite sides of the center post 50" which is the primary supporting member. The center post may be of any shape as it is not designed for deflection purposes but only for support and attachment at one end to a pivot 28" which will be mounted on the carriage of the thrust reverser assembly, and also at bracket 26" to a slide 25 (see FIG. 1). Primary vanes 60 extend transversely across the center post 50" and are pierced at their outer ends away from the center post to allow secondary posts 61 and 62 to pass through, the posts being welded to the vanes. The secondary posts 61 and 62, acting as secondary supporting members, are substantially parallel to the center post 50". The unattached end 29" of the flap will, of course, be located at or near the center of the jet exhaust stream of the engine.

FIG. 15 shows the resulting effect on the primary gas flow pattern of a jet exhaust when flaps such as those of FIGS. 6 to 8 and of FIGS. 11 and 12 having primary vanes parallel to a center post 50 is placed in the exhaust. The substantially parallel flow shown by arrows 63 which exists within a jet engine is deflected outward as shown by arrows 64 on either side of the center post 50.

FIG. 16 shows the resulting effect on the secondary gas flow pattern of a jet exhaust when flaps such as those of FIGS. 6 to 8 and FIG. 11 and FIG. 12 having secondary vanes are placed in the exhaust. An outer portion of the substantially parallel flow shown by arrows 65 which exists within a jet engine is deflected inward shown by arrows 67 toward a position in the geometric center of a jet engine exhaust by secondary vanes 68 located on the flap which is placed in the exhaust. Another flap meeting the first-mentioned flap at unattached ends 29''' deflects other exhaust gas streams inward shown by arrows 69 by means of its secondary vanes 70. The meeting of the inward deflected gas stream shown by arrows 67 and 69 at a position in the geometric center of the jet engine exhaust results in the stream flows shown by arrows 67 and 69 impinging together and deflecting portions of themselves inward, shown by arrows 71 and 72 respectively in FIG. 16 to a position close behind the flaps on the downstream side. Such deflection of gas flow by secondary vanes maintains the pressure behind the flaps in the exhaust stream at the downstream side of the flap.

Figure 17:
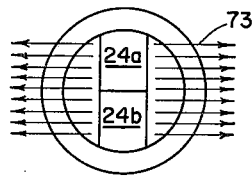
FIG. 17 is a schematic diagram showing a flow pattern attainable by the thrust reverser in FIGS. 1 to 5.

FIG. 17 depicts a reversed gas flow pattern represented by arrows 73 showing two streams symmetrical to a vertical centerline of an aircraft such as is produced by the thrust reverser in FIGS. 1 to 5. The design shown in FIG. 17 is suitable for an aircraft having a jet engine installed in a fuselage with a high empennage or in an aircraft having jet engines installed in single pod nacelles. It is understood that the view is a rear view into the end of a jet exhaust showing flaps 24a and 24b which deflect exhaust gasses and that the arrows 73 also extend forward in the direction of view.

Figure 18:
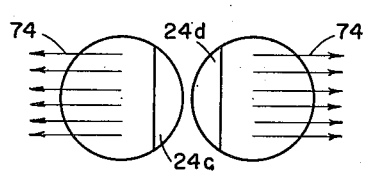
FIG. 18 is a schematic diagram showing a flow pattern attainable by modifying the thrust reverser.

FIG. 18 shows a modified reversed gas flow pattern represented by arrows 74 showing streams from two jet engines which streams are symmetrical to a vertical center line of a nacelle comprising a double pod installation for two jet engines. The view being the same type of view as FIG. 17 shows modified flaps 24c and 24d and also arrows 74 which extend forward in the direction of view.

Figure 19:
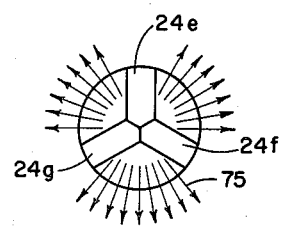
FIG. 19 is a schematic diagram showing another flow pattern attainable by modifying the thrust reverser.

FIG. 19 shows a modified reversed gas flow pattern represented by arrows 75 suitable for a fuselage with "flying tails." The arrows 75 represent two upward side streams between a vertical stabilizer and "flying tails" and also a downward center stream. The view in FIG. 19, like FIG. 17 and FIG. 18 shows modified flaps 24e, 24f and 24g, and also has arrows 75 which represent a stream flow which is also forward in the direction of view.

It will be recognized that by my invention there is provided an efficient and effective mechanism for reversing the thrust of jet engines. The thrust reversing mechanism, when in inoperative position, introduces no appreciable reduction of the thrust of the engine. Moreover, it is safe in its operation; for in the event of failure of the mechanism, the jet stream from the engine moves the obstructing flaps to their inoperative position.

The deflector flap embodiment having the plurality of deflecting surfaces such as in FIG. 13 and FIG. 14 permits a deflector flap to be located close to a jet engine exhaust exit and to the rear thereof without an appreciable rise in tail pipe temperature. There is no trapped heat or trapped exhaust gas on the upstream side of such a deflector flap since the deflecting surfaces are separated and exhaust gases pass through the deflector flap. A broad solid deflector flap would require deflected gases to pass around the deflector flap completely and the blocking off of gases would increase tail pipe temperature and pressure.

An optional embodiment of the deflector flap also has the secondary turning vanes such as in FIGS. 6 to 8 and FIG. 11 and FIG. 12 that direct some exhaust gas inward toward the geometrical center of an exhaust gas stream at positions such as 71 and 72 in FIG. 16, adjacent the deflector flap on the downstream side. Low pressure areas downstream from the deflector flap are thus eliminated. The above means of eliminating low pressure areas helps maintain the portion of exhaust stream deflected by the primary vanes as shown in FIG. 15 in its deflected direction toward the turning vanes located near the jet exhaust periphery.

It will be recognized that various modifications may be made without departing from the scope of the invention and the invention is not limited except in accordance with the scope of the appended claims.

I claim:

1. In combination with a jet engine having an exhaust nozzle through which an exhaust jet stream is expelled rearwardly, thrust reverser mechanism comprising turning vane means located to the rear of the nozzle outside the jet stream when the mechanism is in thrust-reversing operation and flap means between the exit of the nozzle and the turning vane means when the mechanism is in thrust-reversing operation, said flap means comprising an arm movable to a first position transversely across the jet stream and also to a second position out of the jet stream, and means for so moving said arm to either of said positions, said flap means having a first plurality of spaced deflecting surfaces facing upstream in said first position and being slanted relative to the jet stream to deflect a portion of the jet stream outwardly beyond the normal periphery of the jet stream, a second plurality of deflecting surfaces also facing upstream when the flap is in the first position and being slanted relative to the jet stream to deflect another portion of the jet stream flow inwardly toward the longitudinal axis of the jet stream and to a position adjacent and downstream from the flap means, and said first plurality of spaced deflecting surfaces positioned substantially perpendicular to said second plurality of deflecting surfaces.

2. In combination with a jet engine having an exhaust nozzle through which an exhaust jet stream is expelled rearwardly, thrust reverser mechanism comprising turning vane means located to the rear of the nozzle outside the jet stream when the mechanism is in thrust-reversing operation and flap means between the rear of the nozzle and the turning vane means when the mechanism is in thrust-reversing operation, said flap means comprising an arm movable to a first position transversely across the jet stream and also to a second position out of the jet stream, and means for moving said arm to either of said positions, said flap means having a first plurality of spaced deflecting surfaces positioned angularly relative to the direction of the exhaust jet stream, and a second plurality of spaced deflecting surfaces also positioned angularly relative to the direction of the exhaust jet stream but in a different angular longitudinal direction from the angular direction of the first plurality of deflecting surfaces.

3. A jet deflecting device in combination with a thrust reverser at the rear of the exhaust nozzle of a jet engine through which an exhaust jet stream is expelled rearwardly, said device comprising a supporting member, a plurality of primary spaced deflecting surfaces attached to said supporting member in a direction angular to the direction of the exhaust jet stream, and a plurality of secondary spaced deflecting surfaces attached to the supporting member positioned in a different angular longitudinal direction from the first plurality of deflecting surfaces, relative to the direction of the exhaust jet stream.

4. In combination with a jet engine having an exhaust nozzle and a thrust reverser at the rear of the exhaust nozzle through which an exhaust jet stream is expelled rearwardly along a central axis of said nozzle, a jet deflector device comprising: a supporting means, a plurality of primary spaced deflecting surfaces mounted on said supporting means in a direction angular to the direction of the central axis of the exhaust jet stream, said deflecting surfaces extending across the jet stream, and a plurality of secondary spaced deflecting surfaces also positioned in an angular direction relative to the direction of the central axis of the exhaust jet stream, the secondary surfaces being at a different longitudinal angle from the primary surfaces, there being a secondary deflecting surface on each side of the central axis, said last-mentioned secondary surfaces being directed so that the jets deflected thereby on each side will intercept.

5. Apparatus according to claim 4 in which the secondary surfaces extend longitudinal at substantially a right angle relative to the longitudinal direction in which the primary surfaces extend.

6. In combination with a jet engine having an exhaust nozzle and a thrust reverser at the rear of the exhaust nozzle through which an exhaust jet stream is expelled rearwardly along a central axis of said nozzle, a jet deflector device comprising: a primary supporting means, a plurality of spaced struts mounted on said primary supporting means, a plurality of primary spaced deflecting surfaces attached to said struts in a direction angular to the direction of the central axis of the exhaust jet stream, said deflector surfaces extending across the jet stream, a pair of secondary supporting members one disposed on each side of said primary supporting member, said struts being mounted between said primary supporting member and said secondary supporting members, and a plurality of secondary spaced deflecting surfaces also positioned in an angular direction relative to the direction of the exhaust jet stream, the secondary surfaces being at a different longitudinal angle to the longitudinal direction that the primary surfaces extend, there being a secondary deflecting surface on each side of the central axis, said last-mentioned secondary surfaces being directed toward each other so that the jets deflected thereby on each side will intercept.

7. Apparatus according to claim 6 in which the secondary surfaces extend longitudinally at substantially a right angle relative to the direction in which the longitudinally primary surfaces extend.

8. A jet deflecting device adapted for use with a thrust reverser at the rear of the exhaust nozzle of a jet engine through which an exhaust jet stream is expelled rearwardly, said device comprising: a primary supporting member, a plurality of spaced deflecting surfaces attached to said primary supporting member in a direction angular to the direction of the exhaust jet stream, a pair of secondary supporting members one disposed on each side of said primary supporting member, said plurality of spaced deflecting surfaces being mounted between said primary supporting member and each of said secondary supporting members in a direction angular to the direction of the exhaust jet stream, said primary supporting members and secondary supporting members and said deflecting surfaces all extending substantially parallel to each other, and means connected with said secondary supporting members for providing a pivot for said device.

References Cited in the file of this patent

UNITED STATES PATENTS

| 2,551,372 | Haltenberger | May 1, 1951 |
| 2,620,623 | Imbert | Dec. 9, 1952 |
| 2,667,185 | Beavers | Jan. 26, 1954 |
| 2,681,548 | Kappus | June 22, 1954 |
| 2,694,898 | Stauff | Nov. 23, 1954 |
| 2,696,079 | Kappus | Dec. 7, 1954 |
| 2,791,088 | Rao | May 7, 1957 |

(Other references on following page)

UNITED STATES PATENTS

| | | |
|---|---|---|
| 2,797,547 | Meulien et al. | July 2, 1957 |
| 2,797,548 | Marchal et al. | July 2, 1957 |
| 2,802,333 | Price et al. | Aug. 13, 1957 |
| 2,826,382 | Hayden | Mar. 11, 1958 |
| 2,838,909 | Meulien | June 17, 1958 |
| 2,841,954 | Rainbow | July 8, 1958 |
| 2,940,252 | Reinhart | June 14, 1960 |

FOREIGN PATENTS

| | | |
|---|---|---|
| 164,004 | Australia | July 11, 1955 |
| 546,877 | Belgium | Apr. 9, 1956 |

(Corresponding to British Patent 780,669, Aug. 7, 1957)

| | | |
|---|---|---|
| 63,348 | France | Mar. 30, 1955 |
| | (Addition to No. 1,030,483) | |
| 1,090,067 | France | Oct. 13, 1954 |
| 1,092,654 | France | Nov. 10, 1954 |
| 733,727 | Great Britain | July 20, 1955 |
| 739,500 | Great Britain | Nov. 2, 1955 |

OTHER REFERENCES

NACA TN3664 "Summary of Scale Model Thrust Reverser Investigation," February 1956.